(12) United States Patent
Listl

(10) Patent No.: US 6,314,994 B1
(45) Date of Patent: Nov. 13, 2001

(54) ADJUSTMENT FOR SIGNAL TRANSMITTER

(75) Inventor: Holger Listl, Echterdingen (DE)

(73) Assignee: The Foxboro Company, Foxboro, MA (US)

(*) Notice: Subject to any disclaimer, the term of this patent is extended or adjusted under 35 U.S.C. 154(b) by 0 days.

(21) Appl. No.: 09/646,337

(22) PCT Filed: Mar. 15, 1999

(86) PCT No.: PCT/IB98/00627

§ 371 Date: Jan. 4, 2001

§ 102(e) Date: Jan. 4, 2001

(87) PCT Pub. No.: WO99/47841

PCT Pub. Date: Sep. 23, 1999

Related U.S. Application Data

(60) Provisional application No. 60/078,185, filed on Mar. 16, 1998.

(51) Int. Cl.[7] ................................................ F16K 37/00
(52) U.S. Cl. ...................... 137/554; 137/552; 324/207.15
(58) Field of Search ................................. 137/554, 552; 324/207.15

(56) References Cited

U.S. PATENT DOCUMENTS

| | | | |
|---|---|---|---|
| 3,522,596 | * 8/1970 | Fowler et al. | 137/554 |
| 5,099,867 | * 3/1992 | Emery | 137/1 |
| 5,305,781 | * 4/1994 | Raymond, Jr. et al. | 137/554 |
| 5,564,677 | * 10/1996 | Levy et al. | 251/129.12 |
| 5,856,743 | * 1/1999 | Juniman | 324/207.25 |

FOREIGN PATENT DOCUMENTS

| | | |
|---|---|---|
| 2 265 204 A | 9/1993 | (GB). |
| 1578877 | * 9/1992 | (JP) ................ 137/554 |

\* cited by examiner

*Primary Examiner*—A. Michael Chambers
(74) *Attorney, Agent, or Firm*—Foley Hoag & Eliot, LLP; Kevin A. Oliver; W. Hugo Liepmann

(57) ABSTRACT

In a position control system for monitoring the position of a valve, a signal transmitter for generating a signal indicative of a valve position includes a shaft coupled to the valve and rotatable to an azimuth angle indicative of the valve position. The signal transmitter includes a signal flag mounted on the shaft in either a calibration state or an operating state. In the calibrating state, a signal-flag adjuster sets the azimuth angle of the signal flag independently of the shaft or of any other signal flags. In the operating state, the signal flag rotates with the shaft.

10 Claims, 2 Drawing Sheets

ADJUSTMENT FOR SIGNAL TRANSMITTER

This application claims benefit of provisional application Ser. No. 60/078,185, filed Mar. 16, 1998.

This invention relates to devices for verifying the correct operation of a valve positioner in a process control system, and in particular, to a signal transmitter having adjustable limit switches that move in response to movement of a valve positioner.

BACKGROUND

In a feedback control system, a controller obtains the value of a controlled variable, compares that value with a setpoint, and adjusts the value of a manipulated variable in order to drive the controlled variable toward the setpoint. In the context of a process control system, adjustment of the manipulated variable generally involves adjusting a valve. For example, if the controlled variable is the level of fluid in a tank having an intake valve and an outlet valve, the manipulated variable can be the volume rate of flow into or out of the tank. Both of these variables are ultimately manipulated by adjusting the position of a valve. A valve for controlling the flow of fluid is thus a critical component in the control of a processing plant.

To control a valve, the controller sends a signal to a positioner, which is a mechanical device intimately associated with the valve that moves in response to the signal. When the positioner moves, it changes the position of the valve and hence, the value of the manipulated variable controlled by that valve. This change in the manipulated variable results in a corresponding change in the controlled variable. The controller then measures the value of the controlled variable and, if necessary, sends another signal to the positioner to correct the value of the manipulated variable. This process of measurement, followed by correction on the basis of the measurement, is at the heart of a feedback control system.

Unfortunately, it is possible for the controller to send the positioner a signal and for the positioner to do nothing, to move an incorrect amount, or, in the worst case, to move in the wrong direction. The failure of a positioner can, of course, be detected by measuring the value of the controlled variable and observing whether that value is inconsistent with the expected value of the manipulated variable. However, in many processes, there may be significant lag time or dead time. In such processes, it may be some time before the controller realizes that the controlled variable is not changing as expected. During this lag time, significant damage may occur. For example, if the valve controls the flow of coolant in a nuclear power plant, by the time the temperature of the coolant rises, the core temperature may already be dangerously high.

It is therefore desirable to detect the failure of a positioner as soon as possible. Because the positioner is typically hidden from view, this is most readily accomplished by having the positioner transmit a signal verifying that it has, indeed, moved to the location specified by the controller. This generally requires a signal transmitter mechanically coupled to the positioner such that when the positioner is in the desired position, an electrical signal is transmitted to the controller, to an alarm panel, or to some other appropriate location. In a typical signal transmitter of this type, a protruding signal flag coupled to the positioner moves into engagement with an electromagnetic switch when the positioner reaches a desired position.

A disadvantage of known signal transmitters is the difficulty encountered in adjusting the location of the signal flag to accommodate variations in valve positioners. In known signal transmitters, adjustment of the flag location generally requires access to the top and sides of the signal transmitter. In addition, when the flags are loosened for adjustment, they move relatively freely and are therefore difficult to adjust independently of each other with precision.

Because of the difficulty in adjusting the signal flags with precision, the mechanical motion of the positioner needs to be amplified so that small errors in positioning the flags do not result in large errors in the perceived position of the valve. This, in turn, requires that a system of gears having a gear ratio selected to amplify the mechanical motion of the positioner be interposed between the positioner itself and the signal transmitter. This gear system provides yet another source of possible failure, adds to the cost of the signal transmitter, and, because the mechanical resolution of the system is limited by the spacing between the gear teeth, decreases the overall resolution of the signal transmitter.

An additional disadvantage of known signal transmitters is that the signal flags are mounted in a manner susceptible to vibration. Exposure to such vibrations can eventually cause the signal flags to become misaligned. As a result, such signal transmitters require frequent maintenance.

A position indicating apparatus according to the preamble of claim 1 is known from GB 2 265 204 A.

It is thus an object of the invention to provide a signal transmitter in which the signal flags can be adjusted independently of each other with sufficient precision to eliminate the need for an amplifying gear between the positioner and the signal transmitter.

It is a further object of the invention to significantly reduce the sensitivity of the signal flags to vibrations.

SUMMARY

These objects are achieved by an apparatus according to claim 1.

Further developments of the invention are given in the dependent claims.

A signal transmitter incorporating includes a signal flag mounted to a shaft that rotates in azimuth in a manner indicative of the valve position. The signal flag is mounted in either an operating state, in which the signal flag rotates only when the shaft rotates and a calibration state in which the signal flag can be rotated independently of the shaft and any other signal flags mounted thereon.

The signal flag has a switch-engaging portion, which engages a switch when the signal flag is rotated to a selected azimuth angle, thereby causing the switch to generate a signal indicative of the azimuth angle of the switch-engaging portion. This azimuth angle is, in turn, indicative of a particular valve position In the preferred embodiment, the signal flag is an annular disk that is coaxial with the shaft and held between first and second surfaces by a variable compressive force. The annular disk has an inner rim with teeth adapted to engage a gear formed thereon and an outer rim having a protrusion extending radially outward from the switch-engaging portion.

To specify what valve position is to be associated with a particular azimuth angle, an apparatus embodying the invention includes a signal-flag adjuster fixedly mounted to the shaft and coupled to the signal flag. When the signal flag is mounted in its calibration state, the signal-flag adjuster selectively rotates the signal flag independently of the rotation of the shaft and independently of the rotation of any other signal flags mounted to the shaft.

In the preferred embodiment, the signal-flag adjuster includes a rotatable gear for engaging the teeth on the inner rim of the annular disk forming the signal flag. When the signal flag is mounted in its calibration state, rotation of this gear rotates the switching engaging portion of the signal flag independently of the shaft. Typically, the rotating gear is a radially extending portion of the shank of a screw extending parallel to the shaft axis and having a screw head accessible from the outside. Maintenance personnel can therefore perform the necessary calibration without the need to significantly dismantle the signal transmitter.

The diameter of the gear extending from the screw is typically smaller than the inner diameter of the annular disk on which the gear teeth are formed. Consequently, a full rotation of the screw (and hence of the gear) results in only a small change in the azimuth angle of the signal engaging portion of the signal flag. This allows the azimuth angle of the signal flag to be adjusted with great precision.

To switch between the calibration state and the operating state, an apparatus embodying the invention includes a mechanism for applying a variable compressive force between two surfaces supporting this signal flag. To mount the signal flag in its operating state, the screw is rotated in a first direction which draws the two surfaces closer together, thereby increasing the compressive force on the signal flag and preventing it from rotating relative to the shaft. To mount the signal flag in its calibrating state, the screw is rotated in a second direction, thereby allowing the two surfaces to be drawn apart and reducing the compressive force applied to the signal flag. This allows the signal flag to rotate relative to the shaft and to do so independently of any other signal flags also mounted on the shaft.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DETAILED DESCRIPTION

Figure 1:
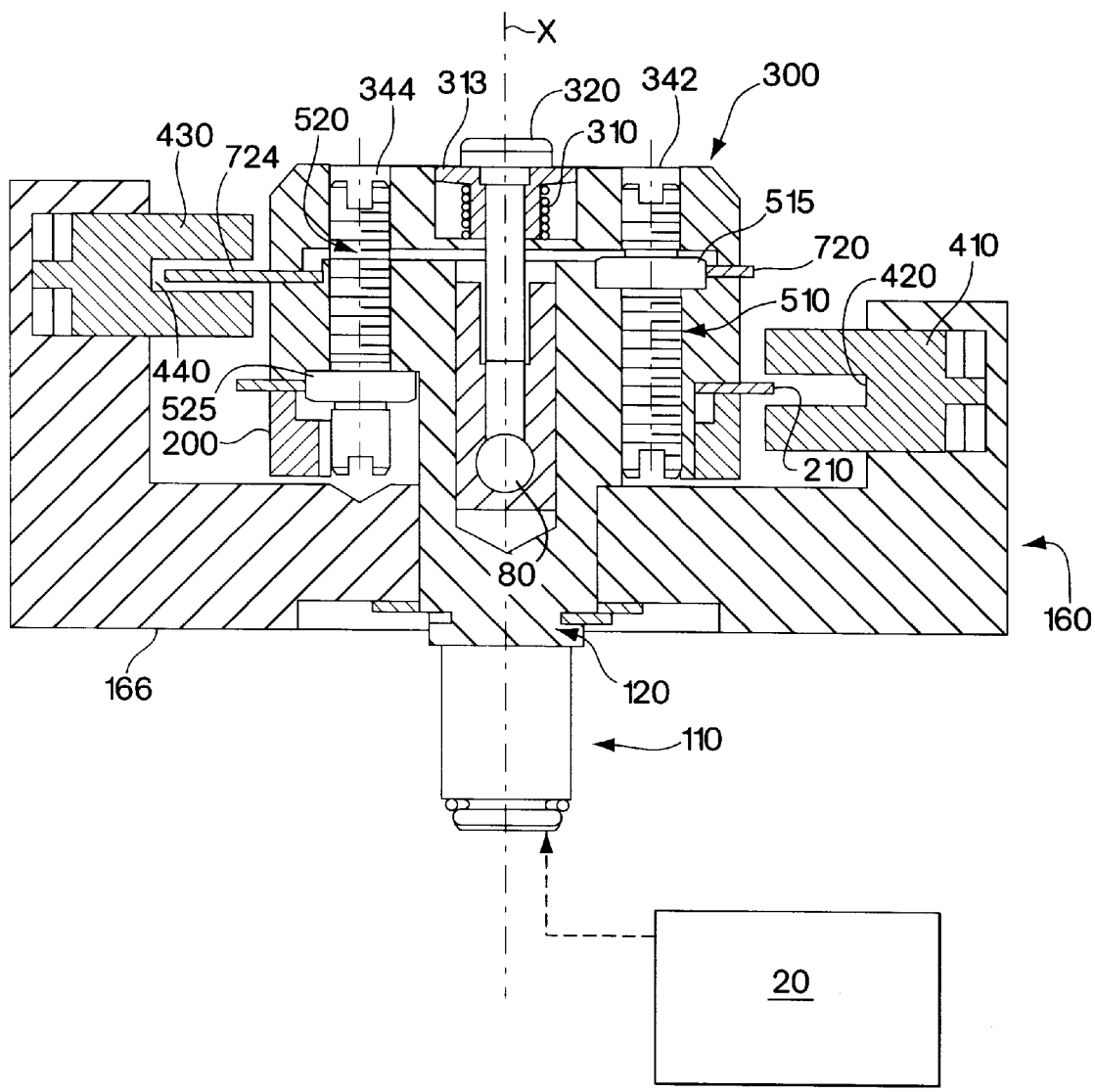
FIG. 1 is a cross-sectional view of a signal transmitter embodying the invention.
Figure 2:
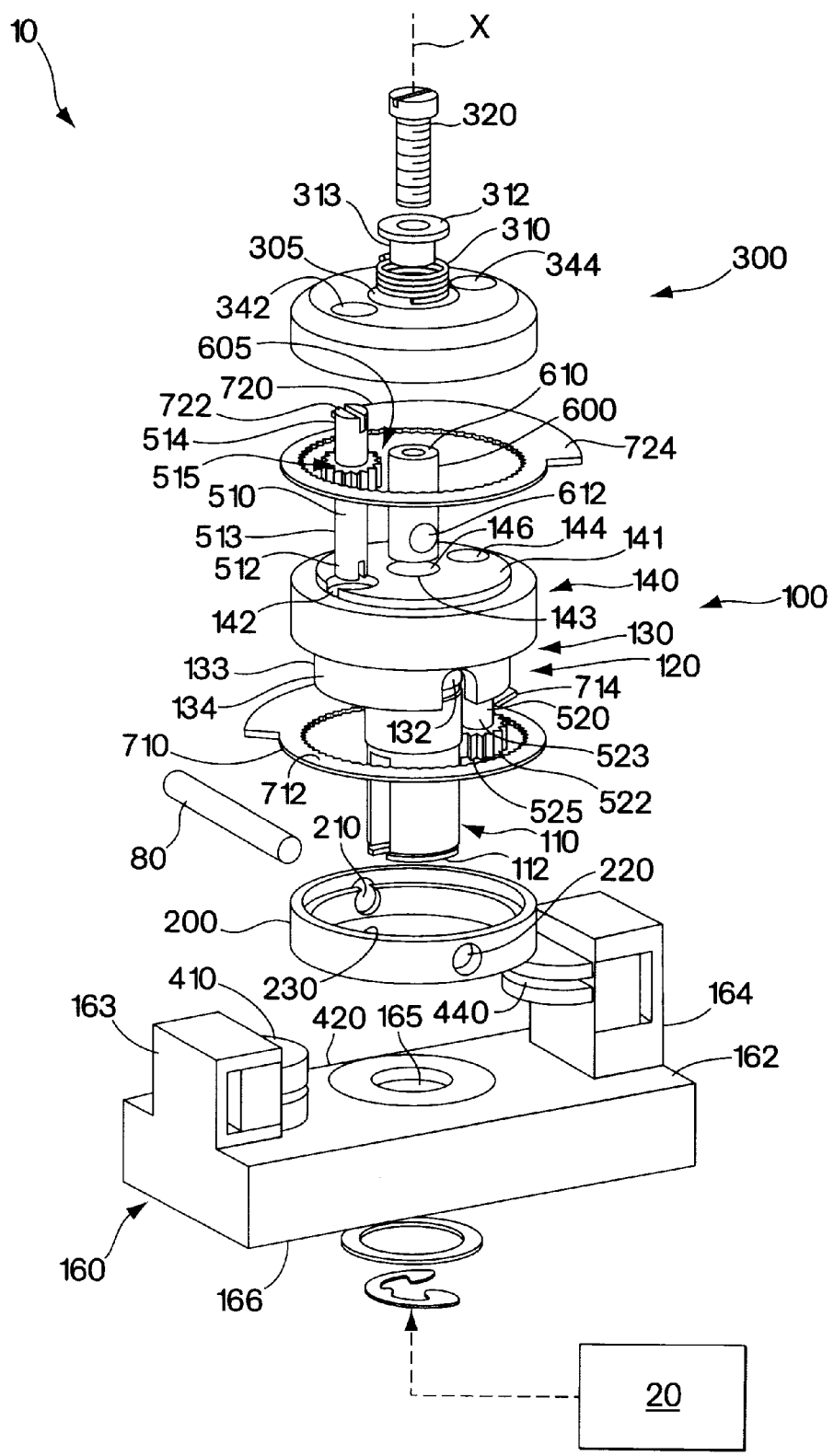
FIG. 2 is an exploded view of the signal transmitter of FIG. 1.

An adjustable signal transmitter 10 embodying the invention, as shown in cross-section in FIG. 1 and in an exploded view in FIG. 2, includes a shaft 100 having a shaft axis X extending in a direction perpendicular to the top surface of a stationary mounting platform 160. The shaft 100 is a generally cylindrical structure having an outer diameter that varies discontinuously along its length. In particular, the shaft 100 includes a positioner-engaging section 110 at its bottom end, a bearing section 120 adjacent to the positioner-engaging section 110, a pin-engaging section 130 adjacent to the bearing section 120, and a flag-bearing section 140 at its topmost end and adjacent to the pin-engaging section 130.

The stationary mounting platform 160 has an upper surface 162 from which a first switch-mounting bracket 163, integral with and located at a first edge of the mounting platform 160, extends upward. A second switch-mounting bracket 164, also integral with the mounting platform 160 extends upward from the upper surface 162 at a second edge opposite the first edge of the stationary mounting platform 160. The first switch-mounting bracket 163 supports a first inductive switch 410 having a groove 420 formed in a direction tangent to a circle centered on the shaft axis X. Similarly, the second switch-mounting bracket 164 supports a second inductive switch 430 also having a groove 440 formed in a direction tangent to a circle centered on the shaft axis X. The second inductive switch 430 is axially displaced relative to the first inductive switch 410 such that a plane passing through the groove 420 in the first inductive switch 410 is parallel to, but not coplanar with, a plane passing through the groove 440 in the second inductive switch 430.

A mounting hole 165 formed in the upper surface 162 between the first and second switch-mounting brackets 163, 164 extends through the stationary platform 160 and connects the upper surface 165 to a lower surface 166 opposed to the upper surface 165, the bearing section 120 of the shaft fits into this mounting hole 165, thereby engaging the shaft 100 to the stationary platform 160.

The bearing section 120 of the shaft 100 has an outer diameter chosen to be large enough to allow it to fit snugly into the mounting hole 165, thereby ensuring that the shaft axis X remain perpendicular to the upper surface 162 of the mounting platform 160. The outer diameter of the bearing section 120 is also chosen to be small enough to allow the bearing section 120 to freely rotate about the shaft axis X relative to the platform 160.

As a consequence of its position below the bearing section 120, the positioner-engaging section 110 of the shaft 100 extends downward from the bearing section 160, through the lower surface 166 of the platform 160, to a free end. The diameter of the positioner-engaging section 110 is thus chosen to be less than or equal to that of the bearing section 120 in order to allow the positioner-engaging section 110 to pass through the mounting hole 165.

The positioner-engaging section 110 is mechanically coupled to a valve positioner 20 so that motion of the valve positioner 20 results in rotation, or a change in the azimuth angle, of the positioner-engaging section 110. This in turn results in rotation, or a change in the azimuth angle, of the entire shaft 100.

In the preferred embodiment, the free end of the positioner-engaging section 110 is bifurcated, or slotted, and the valve positioner 20 has a corresponding protrusion for engaging the slot. Consequently, a rotation of the valve positioner 20 causes a corresponding rotation of the entire shaft 100 relative to the platform 160.

It will be appreciated that the link between the positioner 20 and the shaft 100 is a direct link with no interviewing gears required to amplify the rotation of the positioner 20. This feature of the invention provides simplicity of construction and enhanced reliability in the operation of the signal transmitter 10.

It will also be appreciated that, depending on the details of the design of the valve with which it is to be used, the signal transmitter 10 can be mechanically coupled to the valve directly, thereby bypassing the valve positioner 20.

The pin-engaging section 130 extends upwardly from the bearing section 120 in the direction away from the mounting hole 165. The diameter of the pin-engaging section 130 is preferably larger than that of the mounting hole 165 in order to ensure that only the bearing section 120 and the positioner-engaging section 110 are disposed below the upper surface 162 of the platform 160 and that the remainder of the shaft 100 is above the upper surface 162.

A first radial aperture 132 formed on an outer wall 134 of the pin-engaging section 130 connects an axially extending hollow core 131 to the outside of the shaft 100. Similarly, a second radial aperture 133 formed on the outer wall 134 of the pin-engaging section 130 diametrically opposed from the first radial aperture 132 provides an opening from the axially extending hollow core 131 to the outside of the shaft 100.

The first and second radial apertures 132, 133 in the outer wall of the pin-engaging section 130 are aligned with diametrically opposed first and second collar holes 210, 220 of similar diameter formed in a pin-engaging collar 200 coaxial with the pin-engaging section 130 of the shaft 100. The collar 200 forms an annular space 240 between the outer wall 134 of the pin-engaging section 130 and an inner wall 230 of the pin-engaging collar 200.

The topmost section of the shaft 100, namely the flag-bearing section 140, has a diameter at least as large as the diameter of the pin-engaging section 130 adjacent to it. The flag-bearing section has a top face 141 having a central opening 143 into an axially extending hollow core 146. The hollow core 146 of the flag-bearing section 140 is aligned with, and has the same diameter as, the hollow core 131 of the pin-engaging section 130. The hollow core 131 of the pin-engaging section 130 and the hollow core 146 of the flag-bearing section 140 thus form one continuous hollow core into which a cylindrical sleeve 600 is inserted.

The sleeve 600 has a top face 605 in which is formed an axially extending threaded hole 610. The threaded hole 610 intersects a cylindrical passageway 612 extending along a diameter of the sleeve 600 and perpendicular to the axially extending hole 610. The diameter of the passageway 612 is the same as the diameter of the first and second collar holes 210, 220 in the pin-engaging collar 200 and the same as the diameter of the first and second radial apertures 132, 133 in the pin-engaging section 130 of the shaft 100.

The sleeve 600 is inserted through the opening in the top face 141 of the flag-bearing section 140 such that the top face 605 of the sleeve 600 is coplanar with the top face 141 of the flag-bearing section 140. When inserted in this manner, the sleeve 600 extends through the flag-bearing section 140 and into the pin-engaging section 130. The sleeve 600 is then rotated about the shaft axis X such that the cylindrical passageway 612 aligns with the first and second radial apertures 132, 133 in the pin-engaging section 130. With the cylindrical passageway 612 thus oriented, a locking pin 80 is inserted through the first and second collar holes 210, 220 in the collar 200, the first and second radial apertures 132, 133 in the pin-engaging section 130 of the shaft 100, and through the passageway 612 in the sleeve 600. In this way, the locking pin 80 extends diametrically across the shaft 100 and locks together the shaft 100 and the collar 200.

The top face 141 of the flag-bearing section 140 further includes a first adjustment-screw hole 142 that extends through the flag-bearing section 140 and opens into the annular space 240 between the outer wall 134 of the pin-engaging section 130 and the inner wall 230 of the pin-engaging collar 200. The top face of the flag-bearing section further includes a second adjustment-screw hole 144 diametrically opposed from the first adjustment screw hole 142 and likewise extending through the flag-bearing section 140 and opening into the annular space 240.

A cap 300 covering the top face 141 of the flag bearing section 140 includes a central well 305, best seen in FIG. 1, coaxial with the shaft axis X. The central well 305 has a well floor 307 through which a central screw-hole 309 is formed. A compression spring 310 coaxial with and surrounding an axially extending collar 312 having a flanged end 312 is inserted into the central well 305 with the flanged end 312 of the collar 313 disposed upward and away from the central screw-hole 309. As a result, the compression spring 310 is held between the well floor 307 and the flanged end 312 of the collar 313.

The cap 300 is positioned over the top face 141 of the flag-bearing section 140 such that the central screw-hole 309 in the well floor 307 is aligned with the threaded hole 610 in the flag-bearing section 140. An anchoring screw 320 having threads adapted to mate with the threaded hole 610 is then inserted through the central screw hole 309 and screwed into the threaded hole 610.

The cap 300 farther includes a first adjustment-screw hole 342 extending axially through the cap 300 and a second adjustment-screw hole 344 diametrically opposed to the first adjustment screw-hole 342 and likewise extending axially through the cap 300. The first and second adjustment-screw holes 342, 344 are positioned to align with the first and second adjustment-screw holes 142, 144 in the flag-bearing section 140.

A first adjustment screw 510 extends axially with its base section 512 disposed in the annular space 240, its shank 513 passing through the first adjustment-screw hole 142, a gear section 515 between the shank 513 and the base section 512, and its head 514 protruding beyond the top face 141 of the flag-bearing section 140 and into the first adjustment-screw hole 342 in the cap 300. The shank 513 and base section 515 are cylindrical sections having the same diameter. The gear section 515 is a cylindrical section having a diameter greater than that of the shank 513 and teeth formed in its outer wall. Its axial position on the first adjustment screw 510 is chosen such that a plane passing through the groove 420 in the first inductive switch 410 intersects the gear section 515.

Similarly, a second adjustment screw 520 diametrically opposed to the first adjustment screw 510 extends axially with its shank 523 passing through both the annular space 240 and through the second adjustment-screw hole 144, its head 524 protruding beyond the top face 141 of the flag-bearing section 140 and into the second adjustment-screw hole 342 in the cap 300, and a gear section 525 between the head 524 and the shank 523. The gear section 525 is a cylindrical section axially displaced relative to the gear section 525 of the first adjustment screw 510, having a diameter greater than that of the shank 523 and having teeth formed in its outer wall. Its axial position on the second adjustment screw 520 is chosen such that a plane passing through the groove 440 in the second inductive switch 430 intersects the gear section 525.

The collar 200 and the flag-bearing section 140 fixedly engage between them a first signal flag 710 concentric with the shaft 100. The first signal flag 710 is an annular disk held between a supporting surface 202 on the collar 200 and an engagement surface 145 on the flag-bearing section 140. The axial location and orientation of the annular disk are such that a plane defined by the annular disk passes through the groove 420 in the first inductive switch 410, and such that teeth formed along the inner circumference of the annular disk engage with corresponding teeth on the gear section 525 of the second adjustment screw 520. The annular disk defining the first signal flag 710 is divided into two arcuate sections: a switch-engaging section 714 having an outer diameter of sufficient magnitude to extend the switch-engaging section 714 into the groove 420 of the first inductive switch 410, and a switch-avoiding section 712 having an outer diameter insufficient to extend into the groove 420 regardless of the azimuth angle of the signal flag 710.

Similarly, the flag-bearing section 140 and the cap 300 engage between them a second signal flag 720 concentric with the shaft 100. The second signal flag 720 is an annular disk held between a supporting surface 149 on the flag-bearing section 140 and an engagement surface 349 on the cap 300. The annular disk has an axial location and orientation such that a plane defined by the annular disk passes through the groove 440 in the second inductive switch 430 and such that teeth formed along the inner circumference of the annular disk engage with corresponding teeth on the gear section 515 of the first adjustment screw 510. The annular disk defining the second signal flag 720 is divided into two arcuate sections: a switch-engaging section 724 having an outer diameter of sufficient magnitude to extend the switch-engaging section 724 into the groove 440 of the second inductive switch 430 (as shown in FIG. 1), and a switch-avoiding section 722 having an outer diameter insufficient to extend into the groove 440 regardless of the azimuth angle of the signal flag 720.

As a result of the coupling between the positioner 20 and the positioner-engaging section 110 of the shaft 100, when the positioner 20 changes the position of a valve, the shaft 100 rotates about the shaft axis X. The first signal flag 710, because it is fixedly attached to the shaft 100, also rotates about the shaft axis X.

It is apparent from FIG. 2 that as the shaft 100 rotates, the azimuth angle of the switch-engaging section 714 of the first signal flag 710 changes. As a result, the switch-engaging section 714 enters the groove 420 in the first inductive switch 410. This results in a change in inductance which, in turn, results in the generation of an electrical signal. Because this electrical signal is generated when the shaft 100 is at a selected angular location, and because the selected angular location depends on the motion of the valve positioner 20, the signal thus generated is representative of a particular valve position.

As the shaft 100 continues to rotate, the azimuth angle of the first signal flag continues to change until the switch-engaging section 714 exits the groove 420. This results in another change in inductance which, in turn, results in the generation of another electrical signal representative of the position of the valve.

In the manner described above, the adjustable signal transmitter 10 embodying the invention generates electrical signals verifying that the valve positioner 20 has placed the valve into one of two positions: a first position corresponding to the entry of the switch-engaging section 714 into the groove 420, and a second position corresponding to the exit of the switch-engaging section 714 from the groove 420.

It will be apparent to one of ordinary skill in the art that the second signal flag 720 cooperates with the second inductive switch 430 in a manner similar to the manner described above in connection with the first signal flag 710. As the azimuth angle of the second signal flag 720 changes, the switch-engaging section 724 of the second signal flag 720 enters the groove 440 in the second inductive switch 430. This results in a change in inductance which, in turn, results in the generation of an electrical signal. Because this electrical signal is generated when the shaft 100 is at a selected angular location, and because the selected angular location depends on the motion of the valve positioner 20, the signal thus generated is representative of a particular valve position.

As the shaft 100 continues to rotate, the azimuth angle of the second signal flag 720 continues to change until the switch-engaging section 724 exits the groove 440. This results in another change in inductance which, in turn, results in the generation of another electrical signal representative of the position of the valve.

In the manner described above, the adjustable signal transmitter 10 embodying the invention generates two additional electrical signals verifying that the valve positioner 20 has placed the valve into one of two additional positions: a first position corresponding to the entry of the switch-engaging section 724 into the groove 440, and a second position corresponding to the exit of the switch-engaging section 724 from the groove 440.

The valve position that generates any one of the foregoing signals is determined by the azimuth, or circumferential angle of the switch-engaging sections 714, 724 relative to the shaft 100. For example, suppose that one wishes to ensure that when the valve is in a fully open position, the first inductive switch 410 generates a signal. Under these circumstances, it is necessary to ensure that the switch-engaging section 714 of the first signal flag 710 engages the groove 420. This can be accomplished using a calibration procedure in which one places the valve in the open position and then adjusts the azimuth angle of the first signal flag 710 so that, with the valve in the open position, the switch-engaging element 714 engages the groove 420 in the first inductive switch 410. The ease with which the azimuth angle of the first and second signal flags 710, 730 is adjusted, as set forth below, is a significant advantage of the invention.

The first step in adjusting the azimuth angle of either or both signal flags is to loosen the anchoring screw 320. This moves the cylindrical sleeve 600 downward, and thereby relieves the pressure holding the first signal flag 710 between the collar 200 and the flag-bearing section 140 and the pressure holding the second signal flag 720 between the cap 300 and the flag bearing section 140. However, even with the anchoring screw 320 loosened, the compression spring 310 still exerts a downward force on the well floor 307. As a result of this downward force, the azimuthal motion of the first and second signal flags 710, 720 is constrained.

With the anchoring screw 320 thus loosened, the next step in adjusting the azimuth angle of the first signal flag 710 is to engage the head 524 of the second adjustment screw 520 by inserting a screwdriver, or similar tool, into the second adjustment screw hole 344 in the cap 300. One then twists the head 524 to rotate the second adjustment screw 524 in a direction corresponding to the desired change in the azimuth angle. As the second adjustment screw 524 rotates, the teeth on the gear section 525 engage the teeth on the first signal flag 710, thereby rotating, and hence changing the azimuth angle of, the first signal flag 710. Because the gear section 525 is a smaller diameter gear than the inner diameter of the first signal flag, a complete revolution of the gear section 525 changes the azimuth angle of the signal flag 710 by only a small amount As a result, it is relatively easy to change the azimuth angle by very small amounts.

The foregoing method of adjusting the azimuth angle of the first signal flag by turning an adjustment screw allows for great precision in the choice of azimuth angle. Additionally, because the motion of the force exerted by the compressed spring 310 constains the rotation of the first signal flag, the signal flag rotates only with the adjustment screw is turned; there is no rebound or residuary change in azimuth angle caused by either disengaging the screwdriver from the head 524 or by re-tightening the anchoring screw 320 at the end of the calibration procedure.

It will be apparent to one of ordinary skill in the art that to adjust the azimuth angle of the second signal flag 720, and to do so independently of the azinuth angle of the first signal flag 710, one proceeds as described above in connection with the first signal flag 710, with the exception that one twists the head 514 of the first adjustment screw 510 rather than the second adjustment screw 520.

The last step in the calibration procedure is to re-tighten the anchoring screw 320. This has the effect of drawing the sleeve 600 up toward the cap 300. Since the locking pin 80 passes through the sleeve 600, this also has the effect of drawing the locking pin 80 upward. This in turn causes the collar 200 to be drawn up tightly against the flag-bearing section 140 of the shaft 100, thereby securely fixing the first signal flag 710 between the collar and the flag-bearing section 140. In a similar manner, re-tightening the anchoring screw 320 causes the flag-bearing section 140 to be drawn up tightly against the cap 300, thereby securely fixing the second signal flag 720 between the cap 300 and the flag-bearing section 140.

It will thus be seen that the invention efficiently attains the objects set forth above. Since certain changes may be made in the above constructions without departing from the scope of the invention, it is intended that all matter contained in the above description or shown in the accompanying drawings be interpreted as illustrative and not in a limiting sense.

What is claimed is:

1. A position indicating apparatus for generating an indication signal indicative of a position of a valve, comprising
    a shaft (100) coupled to the valve, said shaft being rotatable to an azimuth angle indicative of the valve position,
    a switch (410, 430) for generating a switch signal,
    a signal flag (710, 720) rotatable with said shaft (100),
    said signal flag (710, 720) having a switch-engaging portion (714, 724) configured to engage the switch (410, 430) when said signal flag is rotated and to thereby generate the switch signal as the indication signal, and
    a signal flag adjuster (510, 520) fixedly mounted to said shaft and coupled to said signal flag for rotating said signal flag independently of the rotation of said shaft to adjust the engagement between the switch-engaging portion (714, 724) and the switch (410, 430) to said azimuth angle, the switch engaging portion (714, 724) including a protrusion extending radially outward from an outer rim of an annular disk coaxial with said shaft (100) characterized in that
    said signal flag is mounted to said shaft (100) in a mounting state selected from one of
    an operating state in which said signal flag (710, 720) is fixedly mounted to said shaft (100) such that said signal flag rotates only when said shaft rotates, and
    a calibration state in which said signal flag rotates independently of said shaft, and
    said signal-flag adjuster (510, 520) is adapted to rotate said signal flag independently of the rotation of the shaft, when the signal flag is mounted in said calibration state.

2. The apparatus of claim 1, wherein said annular disk includes an inner rim having teeth formed thereon.

3. The apparatus of claim 2, wherein said engaging means comprises a rotatable gear (515, 525) adapted to engage said teeth on said inner rim for rotating said signal flag.

4. The apparatus of claim 1, wherein said signal-flag adjuster (510, 520) comprises engaging means for rotatably engaging said signal flag (710, 720).

5. The apparatus of claim 2 or 4, wherein said signal-flag adjuster (510, 520) comprises an axially-extending adjustment screw having a radially-extending gear section (515, 525) extending from a shank (513, 523) thereof, and a screw head (514, 524), said adjustment screw disposed such that said gear section engages said teeth.

6. The apparatus of one of claim 1, further comprising selecting means (310, 320) for selecting between said calibration state and said operating state.

7. The apparatus of claim 6, wherein said selecting means (310, 320) comprises means for applying a variable force on said signal flag.

8. The apparatus of claim 6, wherein said selecting means comprises
    a first surface (202) supporting said signal flag,
    a second surface (145) disposed to place said signal flag between said first surface and said second surface, and
    means for applying a variable compressive force drawing said first and second surfaces to each other, thereby securing said signal flag between said first and second surface with a variable compressive force.

9. The apparatus of claim 8, wherein said means for applying a variable compressive force on said signal flag (710) comprises a screw (320) configured to draw said first (202) and second (145) surfaces together when rotated in a first direction, thereby increasing said compressive force and placing said signal flag in said operating state, and to loosen said two surfaces when rotated in a second direction, thereby decreasing said compressive force and placing said signal flag in said calibration state.

10. The apparatus of claim 9, wherein said means for applying a variable force further comprises biasing means (310) for applying a compressive force to is said two surfaces, when said signal flag (710) is in said calibration state, said compressive force having a magnitude selected to permit adjustment of said signal flag by said signal-flag adjuster (520).

* * * * *